US012308189B2

(12) United States Patent
McTigue et al.

(10) Patent No.: US 12,308,189 B2
(45) Date of Patent: May 20, 2025

(54) SWITCHING DEVICE WITH CERAMIC/GLASS EYELETS

(71) Applicant: Gigavac, LLC, Carpinteria, CA (US)

(72) Inventors: Murray McTigue, Carpinteria, CA (US); Chia-Kai Kevin Jui, Ventura, CA (US); Samuel Naumowicz, Carpinteria, CA (US); Derek Turner, Santa Barbara, CA (US)

(73) Assignee: Gigavac, LLC, Carpinteria, CA (US)

( * ) Notice: Subject to any disclaimer, the term of this patent is extended or adjusted under 35 U.S.C. 154(b) by 275 days.

(21) Appl. No.: 17/580,381

(22) Filed: Jan. 20, 2022

(65) Prior Publication Data

US 2022/0230824 A1 Jul. 21, 2022

Related U.S. Application Data

(60) Provisional application No. 63/140,073, filed on Jan. 21, 2021.

(51) Int. Cl.
*H01H 50/02* (2006.01)
*H01H 33/06* (2006.01)
(Continued)

(52) U.S. Cl.
CPC .......... *H01H 50/023* (2013.01); *H01H 33/06* (2013.01); *H01H 50/14* (2013.01);
(Continued)

(58) Field of Classification Search
None
See application file for complete search history.

(56) References Cited

U.S. PATENT DOCUMENTS 11,443,910 B2 * 9/2022 Bush .................. H01H 71/2445
2007/0109083 A1 * 5/2007 Dettmers ................ H05K 5/06
335/202

(Continued)

FOREIGN PATENT DOCUMENTS

EP 2637190 A1 9/2013
EP 3358593 A1 8/2018

OTHER PUBLICATIONS

Extended European Search Report mailed Nov. 4, 2022 for European Patent Application No. 22152666.8, 12 pages.

*Primary Examiner* — Courtney L Smith
(74) *Attorney, Agent, or Firm* — Lee & Hayes, P.C.

(57) ABSTRACT

Electrical switching devices that can have a housing cup having an opening and a header covering and making a seal with said cup. Internal components are included within the housing, with the internal components configured to change the state of the switching device from a closed state and an open state in response to input. The closed state allows current flow through said device and the open state interrupts current flow through said device. A plurality of fixed contact are included that are electrically connected to said internal components for connection to external circuitry, wherein the fixed contact pass though the header with a portion exposed above the header. A plurality of glass/ceramic eyelets are included, each of which is mounted to a respective one of the fixed contacts on the exposed portion of its one of the fixed contacts. Each of the eyelets can be radially symmetric about its one of the fixed contacts, with the eyelets covering less than all of the header.

16 Claims, 6 Drawing Sheets

(51) Int. Cl.

| | |
|---|---|
| ***H01H 50/14*** | (2006.01) |
| ***H01H 71/02*** | (2006.01) |
| *H01H 50/54* | (2006.01) |

(52) U.S. Cl.

CPC ....... *H01H 71/02* (2013.01); *H01H 2050/025* (2013.01); *H01H 50/546* (2013.01)

(56) References Cited

U.S. PATENT DOCUMENTS

| | | | | |
|---|---|---|---|---|
| 2011/0156845 | A1* | 6/2011 | Eum .................... | H01H 51/065 335/154 |
| 2013/0214884 | A1* | 8/2013 | Ito .......................... | H01H 45/00 335/154 |
| 2017/0148596 | A1* | 5/2017 | Ozaki .................... | H01H 50/14 |
| 2020/0321178 | A1 | 10/2020 | Huang | |
| 2021/0142669 | A1* | 5/2021 | O'Sullivan ........ | G01C 21/3423 |
| 2021/0142969 | A1* | 5/2021 | Bush ...................... | H01H 39/00 |

* cited by examiner

SWITCHING DEVICE WITH CERAMIC/GLASS EYELETS

This application claims the benefit of U.S. Provisional Patent Appl. Ser. No. 63/140,073, filed on Jan. 21, 2021.

BACKGROUND

Field of the Invention

Described herein are electrical switching devices utilizing insulating eyelets or grommets around their fixed contacts that can be made of materials such as ceramic or glass, with some embodiments comprising a stud (stationary), insulating disk and flange as its means for forming a hermetic seal.

Description of the Related Art

Connecting and disconnecting electrical circuits is as old as electrical circuits themselves and is often utilized as a method of switching power to a connected electrical device between "on" and "off" states. Examples of devices commonly utilized to connect and disconnect circuits include contactors and relays ("contactor" or "contactors"), which are electrically connected to one or more devices or power sources. A contactor is configured such that it can interrupt or complete a circuit to control electrical power to and from a device. One type of conventional contactor is a hermetically sealed contactor.

In addition to contactors, which serve the purpose of connecting and disconnecting electrical circuits during normal operation of a device, various additional devices can be employed in order to provide overcurrent protection. These devices can prevent short circuits, overloading, and permanent damage to an electrical system or a connected electrical device. These devices include disconnect devices which can quickly break the circuit in a permanent way such that the circuit will remain broken until the disconnect device is repaired, replaced, or reset. One such type of disconnect device is a fuse device. The descriptions and features described below are primarily directed to contactors, but it is understood that the description and features can also be applied to fuse devices.

Some conventional contactors and fuses have moving components housed within a ceramic housing. These types of contactors can operate with a vacuum formed in the housing or with the housing having internal pressure from an injected gas. This allows the contactors to operate with higher voltage and/or lower resistance characteristics and ceramic housings also allow the contactors to operate at high temperatures and with smaller open gaps and envelope sizes. Ceramic housings, however, can be expensive and difficult to manufacture, can be sensitive to torque, temperature and axial loading, and are also not nodular.

Conventional contactors and fuses may also comprise a housing with a ceramic header. Ceramic headers offer many of the same voltage, resistance and/or temperature characteristics of ceramic housings as well as offering a means whereby contacts can be electrically isolated from one another. Traditional ceramic headers can be difficult and expensive to manufacture because they are complex shapes that require special tooling, difficult metallization, and time-consuming post processes. Traditional ceramic headers also offer limited options for geometry and are usually flat or box-like, and also provide limited options for the location spacing and orientation of the contactor's fixed contacts. Furthermore, multi-contact ceramic headers and ceramic housings can prohibit radial symmetry around the fixed contact, which can impose structural and thermal shock resistance weakness on the ceramic header and housing.

FIGS. 1-3 show a conventional switching device 10 and its ceramic header 12 and fixed contacts 14. The header 12 is arranged to cover the entire opening of the housing/cup 16. The contactor's internal moving components are held in the sealed internal chamber defined by the header 12 and the housing 16. The header has fixed contact 20*a*, 20*b* that pass through the header to interact with internal components of the contactor 10. As further described below, an internal chamber is formed by the housing 16 and header 12, and the internal chamber can be filled with gas by a tube 18 that passes through the header 12. In other embodiments, the tube 18 can be used to form a vacuum in the internal chamber.

The header 12 can comprise a ceramic material. Ceramic is relatively expensive material and by covering the entire opening of the housing, the header can comprise an expensive component of the contactor 10. In addition, the horizontal and single piece nature of the header 12 results in United options for spacing and orientation of the fixed contacts 20*a*, 20*b*. The horizontal header limits the orientation of the fixed contacts 20*a*, 20*b* to vertical unless the header undergoes very expensive customizing. The full ceramic header 12 can also result in practical limitations for implementing other features such as arc suppressing and insulation resistance features, and arc shadowing and shielding features.

SUMMARY

The present invention is directed to contactor switching devices such as contactors that utilize eyelets around the fixed contacts that can comprise insulating materials such as ceramic or glass. One embodiment of electrical switching device according to the present invention comprises a hermitically sealed housing and internal components within the hermetically sealed housing. The internal components are configured to change the state of the switching device from a closed state and an open state in response to input, wherein the closed state allows current flow through the device and the open state interrupts current flow through said device. The device further comprise a plurality of fixed contact electrically connected to the internal components for connection to external circuitry. A plurality of eyelets are included, each of which mounted to respective one of said fixed contacts.

In some embodiments that hermetically sealed housing can comprise a cup and a header, with the fixed contacts protruding from the header. Some embodiments of the eyelets can comprise ceramic or glass, and the header can comprise less expensive and easier to work with materials such as metals or plastics. By utilizing eyelets instead of a full header of ceramic or glass, the amount of expensive material needed for the header is reduced, which can reduce the overall cost of the contactor. Using eyelets can also optimize manufacturing in modular high-volume environments (e.g. pick and place). Using eyelets can also improve the contactor's performance characteristics such as reducing coefficient of thermal expansion (CTE) mismatch and improving mechanical robustness of joints in the contactor.

Eyelets can provide the same desired electrical and thermal characteristic of full ceramic headers, and are smaller and easier to handle during manufacturing. This allows the eyelets to be more easily manufactured to allow for the implementation of features in the eyelet that can increase the reliability of the contactor. Using eyelets also provides for flexibility in the spacing and orientation of the fixed contacts, and the eyelets can be provided with improved shadowing features and geometries. Some eyelet embodiments can be radially symmetric, which can provide increased structural strength and increased thermal shock resistance.

These and other further features and advantages of the invention would be apparent to those skilled in the art from the following detailed description, taken together with the accompanying drawings, wherein like numerals designate corresponding parts in the figures, in which:

DETAILED DESCRIPTION

Figure 1:
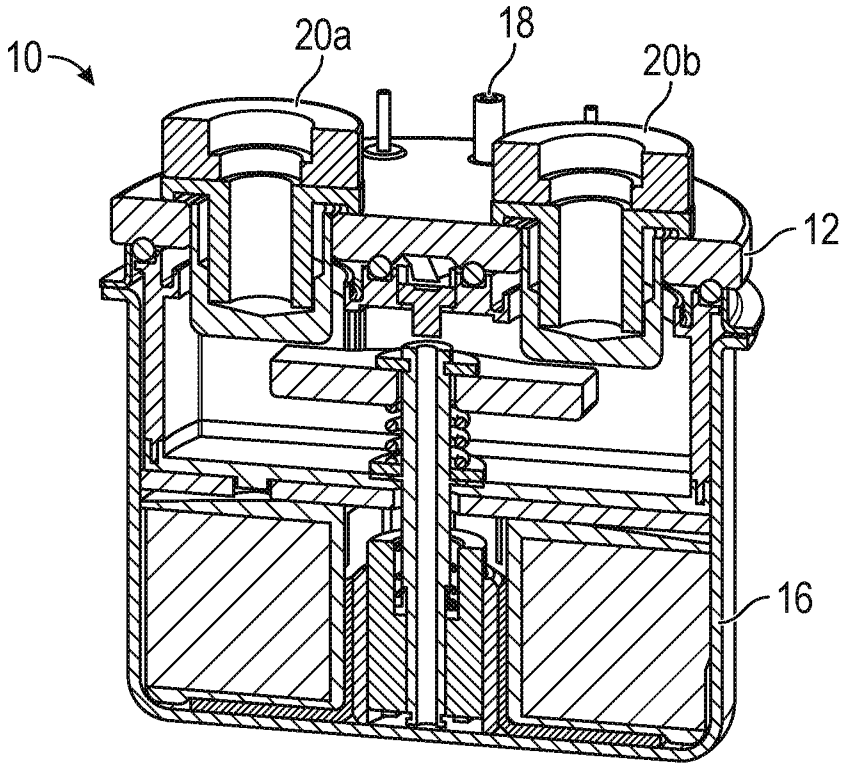
FIG. 1 (PRIOR ART)
FIG. 1 is a sectional perspective view of a conventional switching device with a ceramic header.
Figure 2:
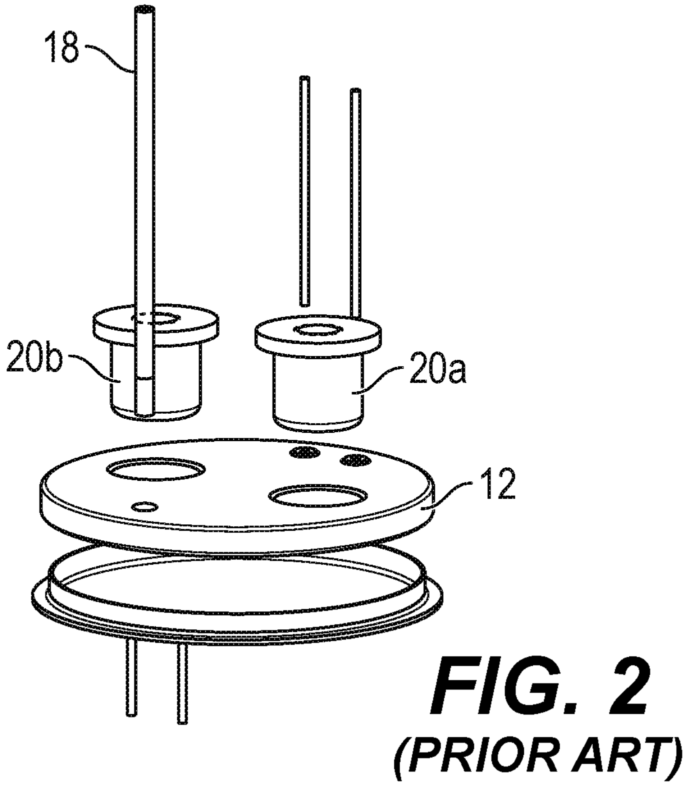
FIG. 2 (PRIOR ART)
FIG. 2 is an exploded perspective view of the ceramic header and fixed contacts for the switching device shown in FIG. 1.
Figure 3:
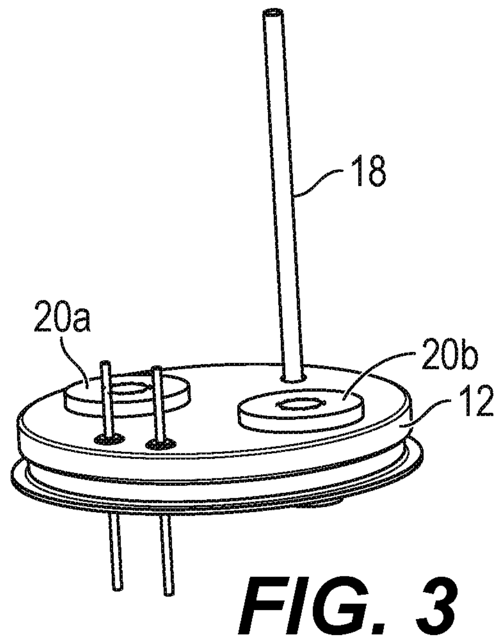
FIG. 3 (PRIOR ART)
FIG. 3 is perspective view of the ceramic header and fixed contacts for the switching device shown in FIG. 1.

The present invention is generally directed to contactor devices having improved headers that can comprise a respective ceramic (or glass) eyelet at each of the fixed contacts instead of a full ceramic header covering the entire housing opening. The term eyelet refers to the use of ceramic or glass material around the fixed contact that covers less than all of the housing opening for the contactor. In some embodiments, the eyelets can be arranged such that they surround the fixed contacts, with some eyelet embodiments being symmetrical around the fixed contact. This can result less material needed to provide the thermal and electrical characteristics of ceramic, thereby reducing material costs of the contactor. The remainder of the header can be made of a less expensive material such as a low carbon steel.

Use of eyelets can also result in improved processing time and less complex manufacturing in that in that metallization of the ceramic is the same on both sides. Some embodiments of the eyelets can also be radially symmetric, which can increase the structural strength of the device and improve its thermal shock resistance.

Having separate ceramic eyelets at each of the fixed contacts can also provide flexibility in the features that can be formed in the eyelets. The size of the eyelets makes the formation of these features easier and less expensive. Many different features can be formed in the eyelets in many different locations, with some of the feature comprising trenches or channels around the fixed contacts. These trenches can serve different functions such as arc shadowing to prevent shorting from deposits formed on the eyelets during arcing events.

Having separate ceramic eyelets also provides design flexibility in the spacing and orientation of the fixed contacts. It is much easier to provide different spacing and orientation for the fixed contacts by mounting the eyelets at different spacings and orientations.

The present disclosure will now set forth detailed descriptions of certain embodiments of contactors according to the present invention. It is understood, however, that the present invention can also be used in other devices, such as fuse devices. These contactors can be electrically connected to an electrical device or system to turn power to the connected device or system "on" or "off."

Throughout this description, the preferred embodiment and examples illustrated should be considered as exemplars, rather than as limitations on the present invention. As used herein, the term "invention," "device," "present invention," or "present device" refers to any one of the embodiments of the invention described herein, and any equivalents. Furthermore, reference to various feature(s) of the "invention," "device," "present invention," or "present device" throughout this document does not mean that all claimed embodiments or methods must include the referenced feature(s).

It is also understood that when an element or feature is referred to as being "on" or "adjacent" to another element or feature, it can be directly on or adjacent to the other element or feature or intervening elements or features may also be present. It is also understood that when an element is referred to as being "attached," "connected" or "coupled" to another element, it can be directly attached, connected or coupled to the other element or intervening elements may be present. In contrast, when an element is referred to as being "directly attached," "directly connected" or "directly coupled" to another element, there are no intervening elements present.

Relative terms, such as "outer," "above," "lower," "below," "horizontal," "vertical" and similar terms, may be used herein to describe a relationship of one feature to another. It is understood that these terms are intended to encompass different orientations in addition to the orientation depicted in the figures.

Although the terms first, second, etc. may be used herein to describe various elements or components, these elements or components should not be limited by these terms. These terms are only used to distinguish one element or component from another element or component. Thus, a first element or component discussed below could be termed a second element or component without departing from the teachings of the present invention.

The terminology used herein is for describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," when used herein, specify the presence of stated features, integers, steps, operations, elements, and/or components, but do not preclude the presence or addition of one or more other features, integers, steps, operations, elements, components, and/or groups thereof.

Embodiments of the invention are described herein with reference to different views and illustrations that are schematic illustrations of idealized embodiments of the invention. As such, variations from the shapes of the illustrations as a result, for example, of manufacturing techniques and/or tolerances are expected. Embodiments of the invention should not be construed as limited to the particular shapes of the regions illustrated herein, but are to include deviations in shapes that result, for example, from manufacturing.

The present invention is described with reference to eyelets made of ceramic or glass. It is understood that the eyelets can be made of many different materials having the desired electrical or thermal characteristics suited for the particular device. It is understood that the present invention is not limited to eyelets made of ceramic or glass.

FIGS. 4-9 show one embodiment of a contactor 100 and its improved header 102 according to the present invention. The contactor 100 comprises a housing/cup 104 that is typically made of a metal material, with one example being a low carbon steel. In other embodiments housing can comprise other materials, such as a plastic, or can comprise a combination of materials.

The header 102 can be mounted to the opening of the housing 104 to form a chamber for holding the contactor's internal components. Fixed contacts 106*a*, 106*b* are included on the header 102 for connecting the contactor 100 to an electrical system. Operation of contactors is generally known in the art and is only briefly discussed with reference to the different components in contactor 100.

Figure 4:
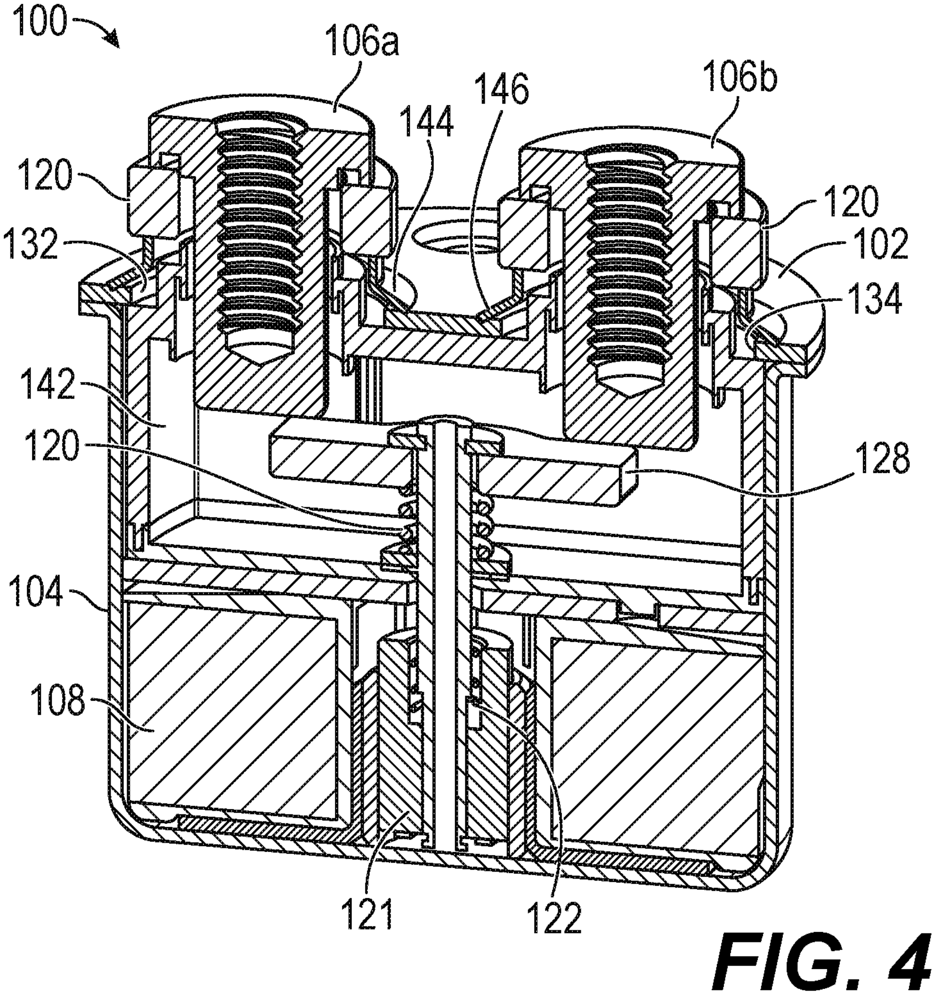
FIG. 4 is a sectional perspective view of one embodiment of a switching device according to the present invention.
Figure 5:
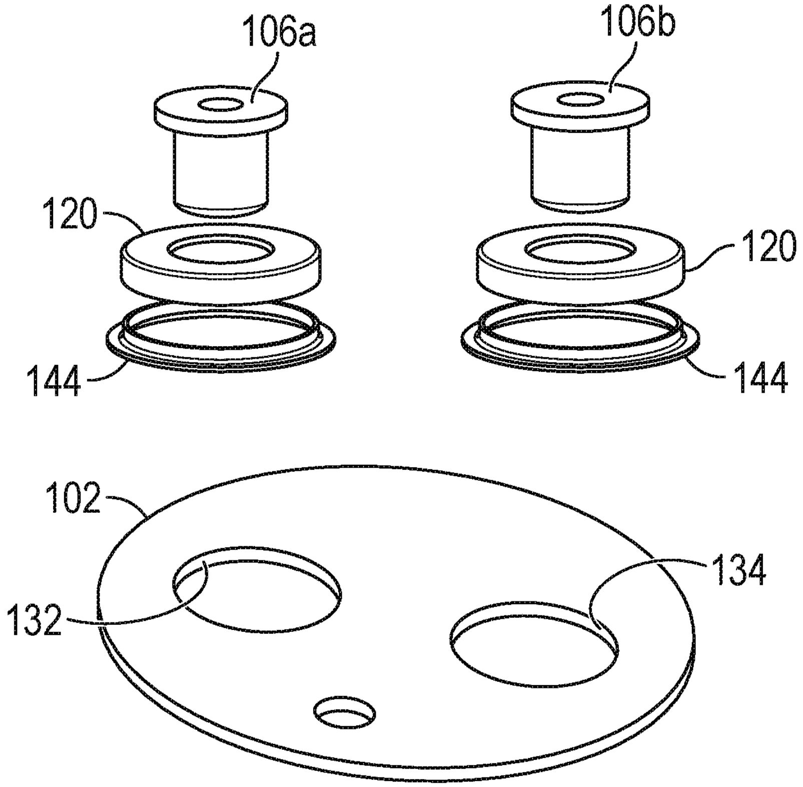
FIG. 5 is an exploded perspective view of one embodiment of an eyelet and fixed contact header assembly according to the present invention.

FIG. 4 shows the internal components of the contactor 100, which include a mechanism for changing the state of the contactor, with a preferred mechanism being a solenoid 108. Many different solenoids can be used, with a suitable solenoid operating under a low voltage and with a relatively high force. Some commercially available solenoids that can be used are available from Bicron Inc., with one example being Bicron Inc. Model No. SD1564 N1200.

The internal components further comprise a plunger 121, a plunger spring 122, a plunger shaft 124, a contact spring 126 and a moveable contact 128. Most of the plunger 121 is arranged within solenoid 118 and the shaft 124 passes through the middle of the plunger 121, with the plunger spring 122 held on the shaft within the plunger 121.

When the solenoid 108 is energized, it moves the moveable contact 128 a certain distance known as the contact gap before it makes contact with the lower surface of the fixed contacts 106*a*, 106*b*. The contact gap provides the electrical isolation to stop current flow through the fixed contacts 106*a*, 106*b* when the movable contact 128 is not in contact with the fixed contacts 106*a*, 106*b*. The compression force of the contact spring 126 is applied to the movable contact 128 to hold in contact with the fixed contacts 106*a*, 106*b* when the solenoid is energized.

The header 102 is included over the opening of the housing 104 and is a flat shape to help make tooling and manufacturing inexpensive. As discussed above, conventional headers can be made of ceramic. For contactor 100 the header can be made of a less expensive and more easily fabricated such as a metal or plastic, or combinations of metals or plastics. In some embodiments, the header 102 can be copper or low carbon steel, or a combination thereof.

The header 102 rests on the upper lip of the housing 104 and can be affixed in place using different methods such as brazing or welding. Header 102 comprises first and second contact holes 132, 134 (best shown in FIG. 5) sized so that fixed contacts 106*a*, 106*b* can pass through the header 102 to be in position to make electrical contact with moveable contact 128.

The header 102 also comprises an evacuation tube and first and second electrical conductors (not shown). In some embodiments, the housing 104 and header 102 can form a hermitically sealed chamber and the evacuation tube can be arranged to allow gasses to be injected into the chamber. In some embodiments, the gasses can be under pressure. In other embodiments, the tube can be used to create a vacuum in the chamber. After the gasses are injected (or vacuum created), the tube is sealed so that no further gasses can pass in or out. The sets of conductors can pass through the header 130 for applying an electrical signal to the internal components of the contactor 100. The solenoid 108 can be energized by applying the appropriate bias to conductors. This can cause the movable contact 128 to move in and out of contact the fixed contacts 106*a*, 106*b*, the movable contact 128 forming a conductive path between the fixed contacts 106*a*, 106*b* with in contact with the fixed contacts 106*a*, 106*b*.

As mentioned above, the header 102 is made of material other than ceramic, with some header embodiments comprising a metal or plastic. The contactor 100 according to the present invention can still provide the desired thermal and electrical characteristics of a ceramic header. Instead of having a full ceramic header covering the entire opening of the housing 104, the contactor according to the present invention comprises ceramic "eyelets" 120 around each of the fixed contacts 106*a*, 106*b*. Using eyelets 120 instead of full ceramic header can provide several advantages.

The eyelets 120 can provide the same electrical and thermal conductivity properties as a ceramic header covering the entire housing opening. By using eyelets, however, the amount of ceramic needed is reduced thereby reducing the overall cost of the contactor 100.

Figure 6:
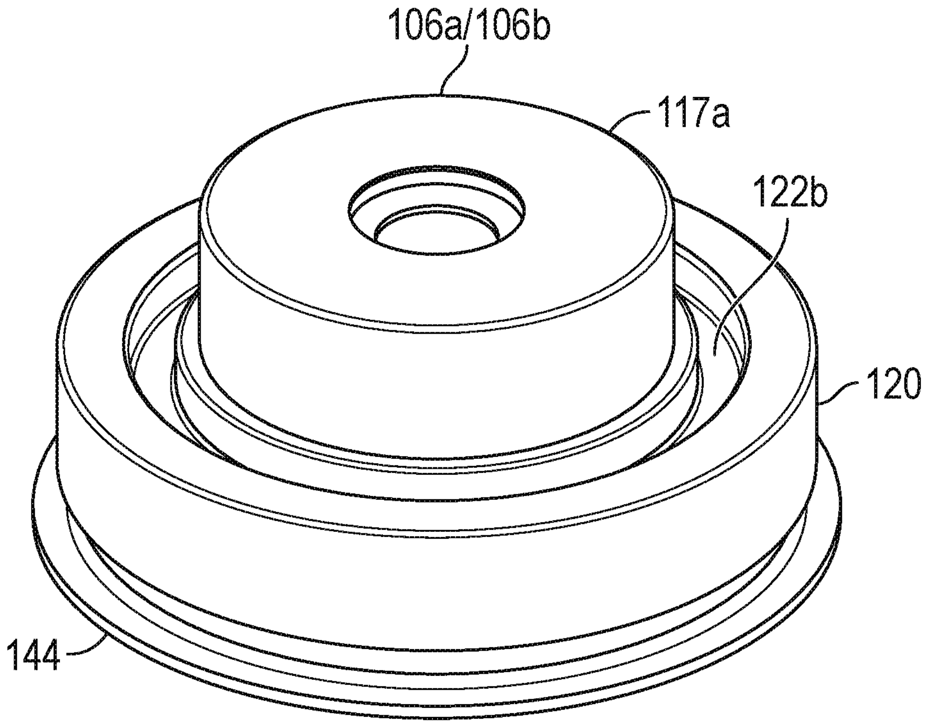
FIG. 6 is a perspective view of an eyelet and fixed contact assembly according to the present invention with improved arc shadowing.
Figure 7:
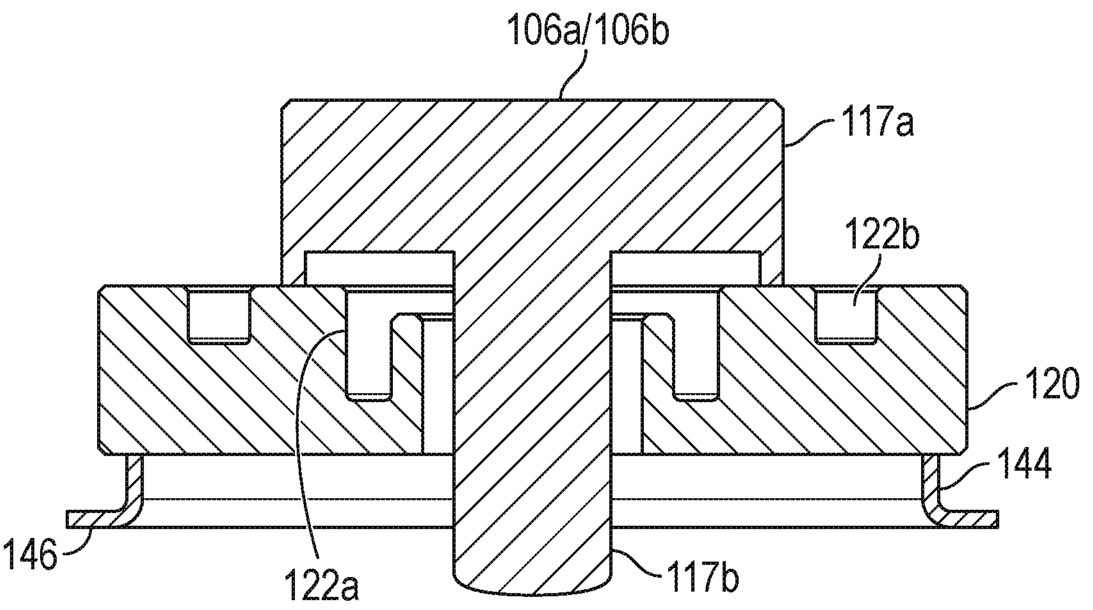
FIG. 7 is a sectional view of the assembly shown in FIG. 6.
Figure 8:
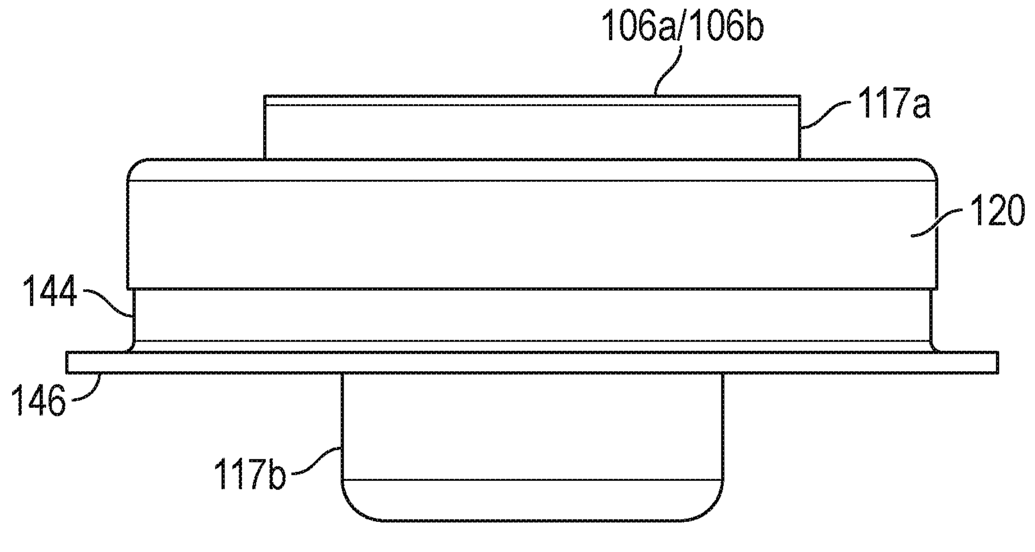
FIG. 8 is a side view of the assembly shown in FIG. 6.
Figure 9:
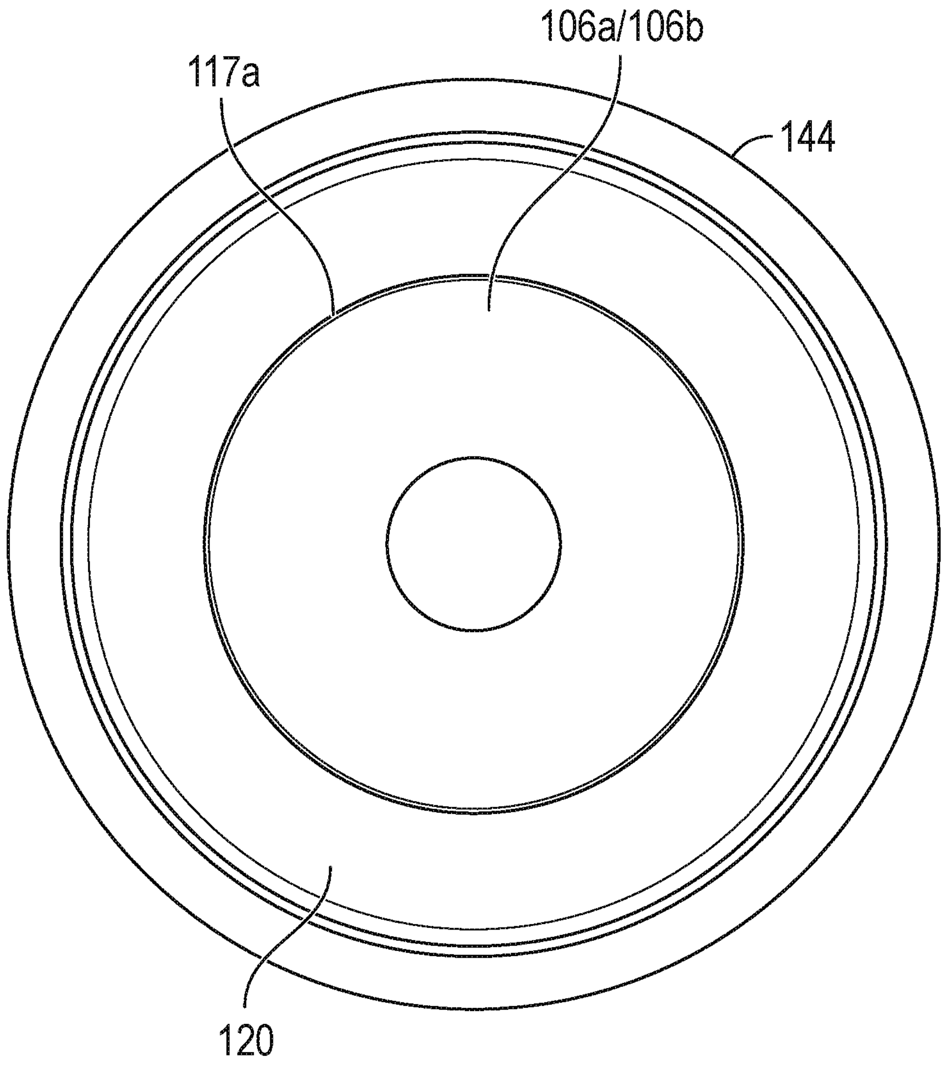
FIG. 9 is a top view of the assembly shown in FIG. 6.

Each of the eyelets can also be more easily shaped or contoured to include features to increase the performance and reliability of the contactor 100. For example, and as best shown in FIGS. 6 and 7, each of the eyelets 120 can contain first and second trenches or channels 122*a*, 122*b* around its one of the fixed contacts 106*a*, 106*b*. In the embodiment shown, each of the fixed contacts 106*a*, 106*b* can have a head 117*a* and body 117*b*, with the body 117*b* passing through the opening in the eyelet 120 (and opening of the header as shown in FIG. 4) and the head 117*a* rests on the top surface of the eyelet 120.

The first channel 122*a* can be arranged below the fixed contact head 117*a* and in a circle around the fixed contact body 117*b*. The second channel 122*b* is also in a circle around the body 117*b*, but is outside the fixed contact head 117*a*. The channels 122*a*, 122*b* can be arranged to provide for more reliable operation of the contactor 100 over the life of the contactor 100. The channels 122*a*, 122*b* can provide a series of varying surfaces that help maintain isolation and dielectric strength between the fixed contacts 106*a*, 106*b* and the surrounding elements of the contactor 100.

Contact arcing and material expulsions during operation can create contact deposits on the surfaces of the eyelet 120. These deposits can be electrically conductive, and the build-up of these deposits can result in the formation of an electrical path over the eyelet surface that can result in a shorting path over the eyelet 120 or the surrounding header surface. This can ultimately result in an electrical short between the fixed contact 106*a*, 106*b*, or a short between the fixed contact 106*a*, 106*b* and other components of the contactor such as the header 102 or housing 104.

The varying surface of the channels 122*a*, 122*b* can help prevent build-up of these deposits in a way that would allow formation of an electrical path, thereby maintaining the dielectric withstand voltage required between the fixed contacts 106*a*, 106*b*. These features are known as arc shadowing features, and can be included in many different locations in the contactor 100 beyond the eyelets 120. It is also noted that the arc shadowing features can take many different shapes and can be in many different locations in the eyelets 120. It is also noted that additional features can be included with the eyelet 120 and its fixed contact 106*a*, 106*b* to help from deposit build-up, including but not limited to, O-rings in different locations around or adjacent to the fixed contact 106*a*, 106*b*.

The channels 122*a*, 122*b* are only one example of the different features that can be included in the eyelets 120. The use of eyelets 120 provide the advantage of being much easier to form features such as the channels compared to forming the same features in a full ceramic header.

The use of eyelets instead of a full ceramic header provides further advantages. In some embodiments, it may also be desirable to have one or both of the fixed contacts at any angle different from the standard orientation provided by a full planar ceramic header. The present invention allows for this differing angle arrangement by simply angling the features found below the eyelet, including a portion of the header 130 or the portion of the internal chamber 142 that passes up through the header holes 132, 134. Using eyelets also allows for more flexibility in spacing of the fixed contacts 106*a*, 106*b*. Different contacts can have different spacing between the header holes and the portion of the internal chamber passing into the header holes 132, 134. For these different embodiments, the same eyelets 120 can be used. This allows for the manufacturing and stocking of eyelets that can be used in many different contactors.

It is understood that the eyelets according to the present invention can have many different shapes and sizes beyond those described herein, and can have many different features. It is also understood that the fixed contacts do not need to have eyelets of the same size or shape, or with the same features.

The eyelets 120 can be mounted to the header 130 using many different material and methods. In the embodiment shown, a metal ring (or flange) 144 can be attached to the bottom surface of the each of the eyelets 120. Many different attachment mechanisms can be used including brazing or welding. The metal ring 144 has a flange 146 that rests on the header 130 and can also be mounted in place using brazing or welding. In some embodiments, the attachment of the ring 144 to the eyelets 120 and header 130 can also provide for a hermitic seal.

Figure 10:
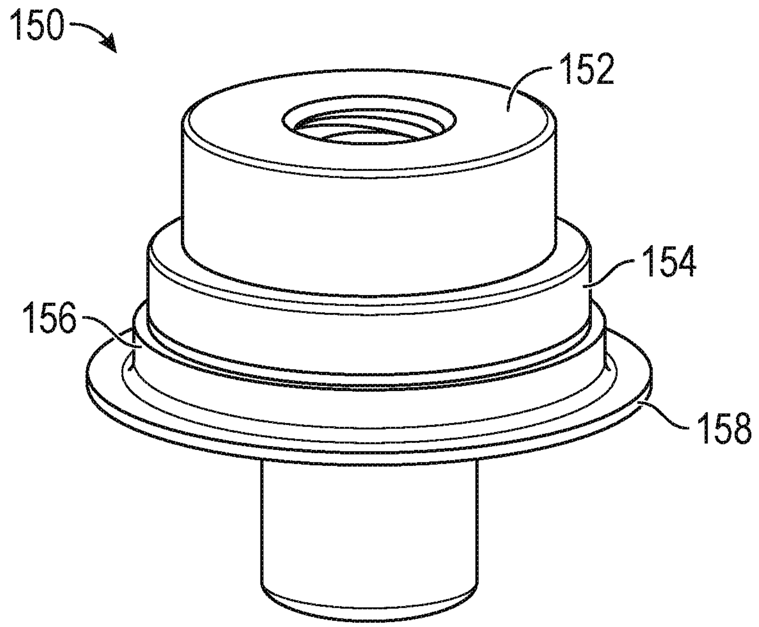
FIG. 10 is a perspective view of another embodiment of an eyelet and fixed contact assembly according to the present invention.
Figure 11:
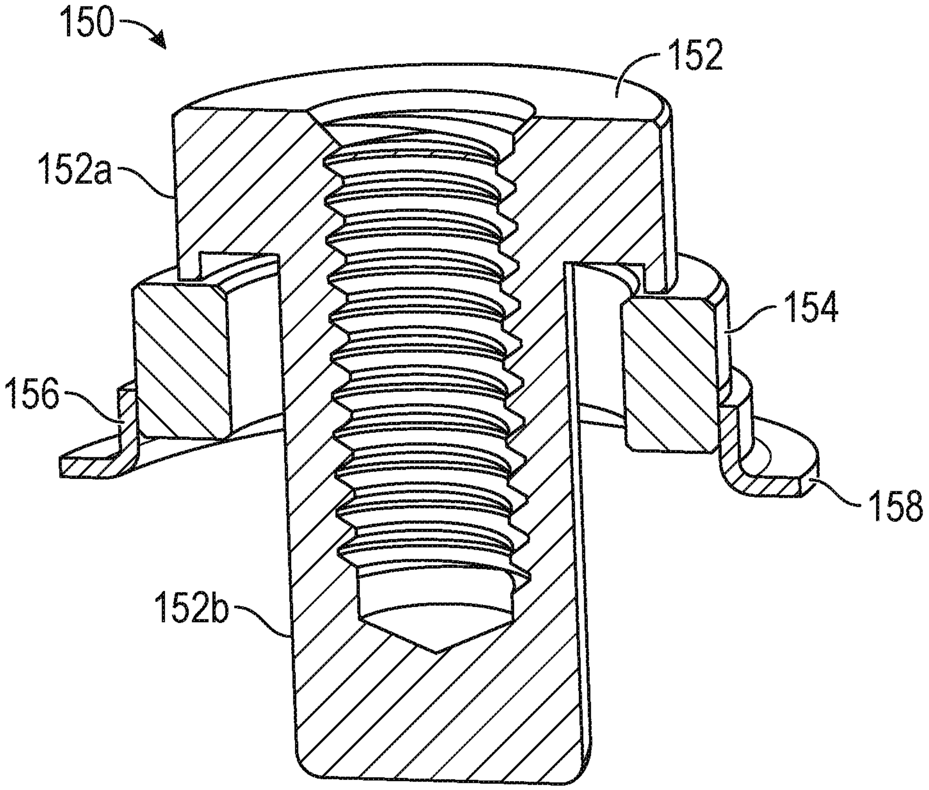
FIG. 11 is a sectional view of the assembly shown in FIG. 10.

It is understood that the different embodiments of eyelets and fixed contacts according to the present invention can be arranged in many different ways. FIGS. 10 and 11 show another embodiment of a fixed contact and eyelet assembly 150 according to the present invention that comprises many of the same components and features as the embodiment described above. The assembly comprises a fixed contact 152, an eyelet 154 and a metal ring (or flange) 156. Like the embodiment above, the fixed contact 152 can have a head 152*a* and body 152*b*, with the body 152*b* passing through the opening in the eyelet 154, with the 152*a* resting on the top surface of the eyelet 152.

In this embodiment, the metal ring 156 ring is affixed to the side surface of the eyelet 154, instead of the bottom surface. The eyelets 154 can then be mounted to the header using many different material and methods. Many different attachment mechanisms can be used for attaching the ring 156 to the eyelet 154 including brazing or welding. Like the embodiment above, the metal ring 156 has a flange 158 that rests on the header and can also be mounted in place using brazing or welding. In some embodiments, the attachment of the ring 156 to the eyelets 154 and header can also provide for a hermitic seal.

Although the present invention has been described in detail with reference to certain preferred configurations thereof, other versions are possible. Embodiments of the present invention can comprise any combination of compatible features shown in the various figures, and these embodiments should not be limited to those expressly illustrated and discussed. Therefore, the spirit and scope of the invention should not be limited to the versions described above.

The foregoing is intended to cover all modifications and alternative constructions falling within the spirit and scope of the invention, wherein no portion of the disclosure is intended, expressly or implicitly, to be dedicated to the public domain if not set forth in any claims.

We claim:

1. An electrical switching device, comprising:
- a hermitically sealed housing comprising a cup with a header;
- a movable contact disposed in the hermetically sealed housing, the movable contact configured to move between a first position and a second position;
- a solenoid disposed in the hermetically sealed housing and coupled to the movable contact, the solenoid configured to move the movable contact to the first position from the second position when energized;
- a first fixed contact and a second fixed contact spaced from the first fixed contact, the first fixed contact and the second fixed contact passing through the header such that portions of the first fixed contact and the second fixed contact protrude from the header and extending into the hermetically sealed housing such that, in the first position, the movable contact contacts the first fixed contact and the second fixed contact to allow current flow between the first fixed contact and the second fixed contact and, in the second position, the movable contact is spaced from at least one of the first fixed contact and the second fixed contact;
- a first eyelet configured to seal the first fixed contact relative to the hermetically sealed housing and a second eyelet configured to seal the second fixed contact relative to the hermetically sealed housing, the first eyelet and the second eyelet mounted to the portions protruding from the header; and
- a metal ring surrounding at least one of the first eyelet or the second eyelet and attached to a side surface of the at least one of the first eyelet or the second eyelet for attachment to the header.

2. The electrical switching device of claim 1, wherein at least one surface of the header is planar.

3. The electrical switching device of claim 1, wherein the first eyelet and the second eyelet cover less than all of the header.

4. The electrical switching device of claim 1, wherein at least one of the first eyelet or the second eyelet is radially symmetric.

5. The electrical switching device of claim 1, wherein the first eyelet and the second eyelet are made of ceramic or glass.

6. The electrical switching device of claim 1, wherein at least one of the first eyelet and the second eyelet comprises features to prevent build-up of deposits that form an electrical path.

7. The electrical switching device of claim 1, wherein each of the first eyelet and the second eyelet further comprises a channel around the corresponding first fixed contact and second fixed contact.

8. The electrical switching device of claim 1, wherein the metal ring comprises a flange.

9. An electrical switching device, comprising:

a cup having an opening;

a header covering the opening and making a seal with the cup;

a movable contact disposed in the hermetically sealed housing and configured to move between a first position and a second position;

a solenoid disposed in the hermetically sealed housing and coupled to the movable contact, the solenoid configured to move the movable contact to the first position from the second position when energized;

a first fixed contact and a second fixed contact spaced from the first fixed contact, the first fixed contact and the second fixed contact extending into the cup such that, in the first position, the movable contact contacts the first fixed contact and the second fixed contact to allow current flow between the first fixed contact and the second fixed contact and, in the second position, the movable contact is spaced from at least one of the first fixed contact and the second fixed contact, wherein the first fixed contact and the second fixed contact pass though the header such that portions of the first fixed contact and the second fixed contact protrude from the header;

a first eyelet and a second eyelet mounted to the portions of the first fixed contact and the second fixed contact protruding from the header; and a metal ring surrounding at least one of the first eyelet or the second eyelet and attached to a side surface of the at least one of the first eyelet or the second eyelet for attachment to the header.

10. The electrical switching device of claim 9, wherein the first eyelet and the second eyelet cover less than all of the header.

11. The electrical switching device of claim 9, wherein at least one of the first eyelet or the second eyelet is radially symmetric.

12. The electrical switching device of claim 9, wherein at least one eyelet of the first eyelet or the second eyelet is made of ceramic or glass.

13. The electrical switching device of claim 9, wherein at least one of the first eyelet or the second eyelet comprises features to prevent build-up of deposits that form an electrical path.

14. The electrical switching device of claim 13, wherein each of the first eyelet or the second eyelet further comprises a channel around the corresponding fixed contact and the second fixed contact.

15. The electrical switching device of claim 9, wherein at least one of the first eyelet of the second eyelet further comprises a metal ring providing a surface for mounting to the header.

16. An electrical switching device, comprising:

a hermitically sealed housing comprising a cup with a header;

a movable contact disposed in the hermetically sealed housing, the movable contact configured to move between a first position and a second position;

a solenoid disposed in the hermetically sealed housing and coupled to the movable contact, the solenoid configured to move the movable contact to the first position from the second position when energized;

a first fixed contact and a second fixed contact passing through the header, each of the first fixed contact and the second fixed contact comprising a portion protruding from the header;

a first radially symmetric eyelet and a second radially symmetric eyelet respectively mounted to the portions of the first fixed contact and the second fixed contact protruding from the header; and a metal ring surrounding at least one of the first eyelet or the second eyelet and attached to a side surface of the at least one of the first eyelet or the second eyelet for attachment to the header.

* * * * *